United States Patent
Kim et al.

(10) Patent No.: US 10,754,423 B2
(45) Date of Patent: Aug. 25, 2020

(54) PROVIDING VIRTUAL REALITY EXPERIENCE SERVICE

(71) Applicant: KT CORPORATION, Gyeonggi-do (KR)

(72) Inventors: Kang-Tae Kim, Seoul (KR); I-Gil Kim, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 114 days.

(21) Appl. No.: 16/011,904

(22) Filed: Jun. 19, 2018

(65) Prior Publication Data

US 2018/0364801 A1  Dec. 20, 2018

(30) Foreign Application Priority Data

Jun. 19, 2017  (KR) .................. 10-2017-0077548

(51) Int. Cl.
| | | |
|---|---|---|
| *G06F 3/01* | (2006.01) | |
| *G06F 3/0481* | (2013.01) | |
| *G06T 7/285* | (2017.01) | |
| *G06F 3/0346* | (2013.01) | |
| *G02B 27/01* | (2006.01) | |

(Continued)

(52) U.S. Cl.
CPC ......... *G06F 3/012* (2013.01); *G02B 27/0093* (2013.01); *G02B 27/017* (2013.01); *G02B 27/0172* (2013.01); *G06F 3/011* (2013.01); *G06F 3/0346* (2013.01); *G06F 3/04815* (2013.01); *G06T 7/285* (2017.01); *G06T 15/205* (2013.01); *G06T 19/006* (2013.01); *H04N 5/247* (2013.01); *H04N 13/194* (2018.05); *H04N 13/279* (2018.05); *H04N 13/344* (2018.05); *G02B 2027/0134* (2013.01); *G02B 2027/0138* (2013.01); *G02B 2027/0181* (2013.01);

(Continued)

(58) Field of Classification Search
None
See application file for complete search history.

(56) References Cited

U.S. PATENT DOCUMENTS

| | | | |
|---|---|---|---|
| 10,403,050 B1 * | 9/2019 | Beall | ........................ G06F 3/011 |
| 2015/0220143 A1 | 8/2015 | Choi et al. | |

(Continued)

FOREIGN PATENT DOCUMENTS

| | | |
|---|---|---|
| JP | 2015-049716 A | 3/2015 |
| KR | 10-2015-0091653 A | 8/2015 |

(Continued)

*Primary Examiner* — Dov Popovici
(74) *Attorney, Agent, or Firm* — IP Legal Services, LLC

(57) ABSTRACT

A user device and a server provide a VR experience service to a user without significant interruption in response to a user's movement. In particular, the server may create a stitched image of a 360-degree video of a predetermined virtual environment according to a user movement state and transmit the stitched image to a user device. The user device may i) receive, from a server through a wireless link, a stitched image of a 360-degree video of a predetermined virtual environment which is dynamically changed according to a user movement state and ii) render a stereoscopic image at a user's view-point which is dynamically changed according to a user's head movement, using the received stitched image of the 360-degree view of the predetermined virtual environment.

20 Claims, 10 Drawing Sheets

(51) Int. Cl.
*H04N 5/247* (2006.01)
*G06T 19/00* (2011.01)
*H04N 13/194* (2018.01)
*G02B 27/00* (2006.01)
*G06T 15/20* (2011.01)
*H04N 13/344* (2018.01)
*H04N 13/279* (2018.01)

(52) U.S. Cl.
CPC .. *G02B 2027/0187* (2013.01); *G06T 2200/16* (2013.01); *G06T 2200/32* (2013.01)

(56) References Cited

U.S. PATENT DOCUMENTS

| | | | |
|---|---|---|---|
| 2016/0225188 A1* | 8/2016 | Ruddell | G06F 3/011 |
| 2016/0301866 A1 | 10/2016 | Kim et al. | |
| 2016/0314100 A1 | 10/2016 | Seo et al. | |
| 2016/0320833 A1* | 11/2016 | Schuman | G06F 3/147 |
| 2018/0091577 A1 | 3/2018 | Park et al. | |
| 2018/0232050 A1* | 8/2018 | Ofek | G06F 3/016 |
| 2019/0279428 A1* | 9/2019 | MacK | H04N 9/646 |

FOREIGN PATENT DOCUMENTS

| | | |
|---|---|---|
| KR | 10-2015-0123605 A | 11/2015 |
| KR | 10-1577627 B1 | 12/2015 |
| KR | 10-2016-0121145 A | 10/2016 |
| KR | 10-2016-0125708 A | 11/2016 |
| KR | 10-2016-0126563 A | 11/2016 |
| KR | 10-2017-0013737 A | 2/2017 |
| KR | 10-1703924 B1 | 2/2017 |

* cited by examiner

FIG.8
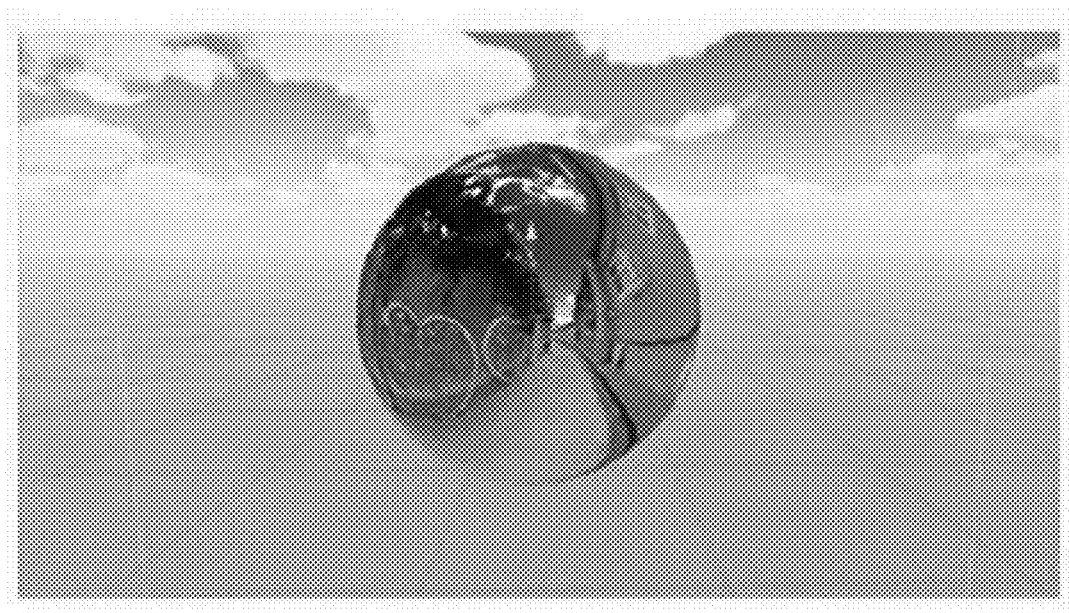
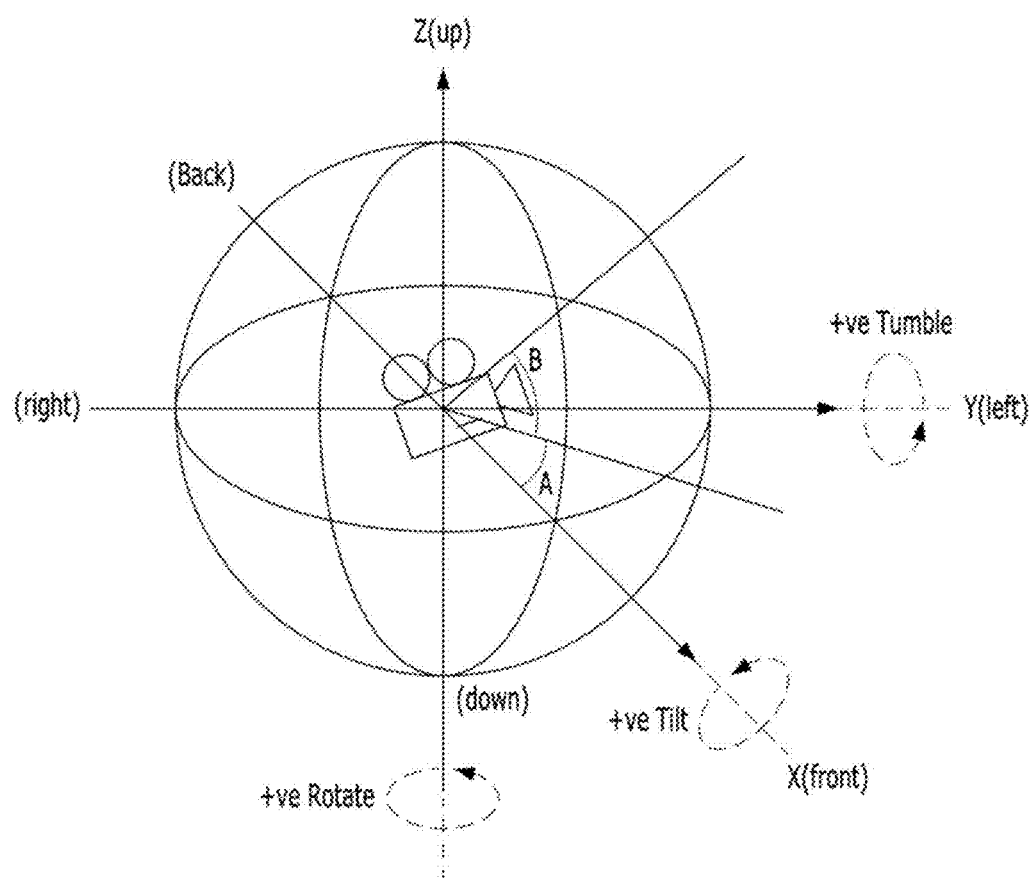

FIG.9

Algorithm 1 Dynamic Camera Operation based on User's Head Movements

Input: $C_i$: 6-sided camera modules  ▷ $i$: index of cameras (0 to 5)
Input: $N_i(x, y, z)$: normal vector of each camera  ▷ $i$: index of cameras
Input: $P_n(x, y, z)$: tracked position of user's head  ▷ $n$: current frame
Input: $N$: size of samples to track positions of user's head
Input: State: user movement state (walk-through or stay-still)

1: Example) $C_0$: front, $C_1$: back, $C_2$: top, $C_3$: bottom, $C_4$: left, $C_5$: right
2: for each k do  ▷ k: each result of position tracking
3:   for k ← 0 to N do
4:     $V_m$ = Compute linear regression of N Samples  ▷ $V_m$: velocity
5:     if $|V_m| \geq \alpha$ then State = walk-through  ▷ $\alpha$: manual factor
6:     else State = stay-still
7:     if k == N then k = 0;
8:   for each n do  ▷ each frame
9:     for i ← 0 to 5 do
10:      $\theta_i = \cos^{-1}(N_i \cdot V_m / |N_i||V_m|)$  ▷ in case of $\theta$ is degree value
11:      if (State == walk-through || 180−β ≤ $\theta_i$ ≤ 180+β) then
12:        Deactivate( $C_i$ );  ▷ $C_i$ is designated with back camera
13:        ReduceResolution( $C_{(i+1)\%5}$, $C_{(i-1)\%5}$ );
14:        ▷ β: manual factor  ▷ %: modular operation

PROVIDING VIRTUAL REALITY EXPERIENCE SERVICE

CROSS REFERENCE TO PRIOR APPLICATIONS

The present application claims priority under 35 U.S.C. § 119 to Korean Patent Application No. 10-2017-0077548 (filed on Jun. 19, 2017).

BACKGROUND

The present disclosure relates to a virtual reality (VR) experience service and, more particularly, to seamlessly providing a VR experience service to a user in response to user actions through a wireless communication link.

A virtual reality (VR) experience service enables a user to experience a virtual reality at a stationary position (a fixed location) using a VR technology. Such a VR experience service may be provided through a media streaming scheme from a server to a user device (e.g., head mounted device). For example, a server creates a virtual environment with three dimensional (3D) graphic images, receives information on user's positions and movements whenever the user makes movements, reflects such user's positions and movements to the virtual environment based on the received information, and streams images (e.g., stereoscopic images) of the reflected virtual space to a user device. Then, the user device may display the streamed images of the virtual space on a stereoscopic display.

In general, a user changes positions and movements abruptly and frequently in the virtual space. Accordingly, the server needs to quickly and immediately reflect such changes in the virtual environment and transmits the result to the user device for displaying the reflected and changed virtual environment to the user. However, there is delay caused by image processing and data transmission. Accordingly, there is a demand for reducing such a delay in processing images in response to the user's movements and transmitting the result to the user device.

SUMMARY

In accordance with an aspect of the present embodiment, a 360-degree image of a virtual space may be generated differently according to a user movement state in the virtual space.

In accordance with another aspect of the present embodiment, a server may generate a 360-degree image of a virtual space according to a user movement state in the virtual space and transmit a stitched image of the generated 360-degree image to a user device.

In accordance with further another aspect of the present embodiment, a user device may receive a stitched image of a virtual space from a server, generate a stereoscopic image based on a viewpoint of a user in the virtual space according to a head movement of the user, and display the generated stereoscopic image for providing a virtual reality experience service.

In accordance with still another aspect of the present embodiment, a server may create a stitched image of a 360-degree image of a predetermined virtual space based on a user's location in the predetermined virtual space and user movements (e.g., walking, running, and stay still) and transmit the created stitched image of the 360-degree image of the predetermined virtual space to a user device using a media-streaming scheme.

In accordance with yet another aspect of the present embodiment, a user device may receive a stitched images for a 360-degree image of a virtual space from a server, render a user-view point image and peripheral images using the received stitched images based on a head movement of a user, and output the rendered images on a display.

In accordance with further still another aspect of the present embodiment, a server may generate a stitched image for a 360-degree image of a predetermined virtual space based on user movements (e.g. walk, run, and stay-still), and a user device may generate a stereoscopic image of the predetermined virtual space based on head movements (e.g., rotation to left or right, rotation to up or down) using the stitched image from the server.

In accordance with one embodiment, a method may be provided for providing, by a server, a virtual reality service to a user device. The method may include: receiving user tracking information from the user device; generating a plurality of virtual cameras and setting up the plurality of virtual cameras at predetermined locations corresponding to a user location in a predetermined virtual space based on the user tracking information; determining a user movement state based on the user tracking information; controlling an operation state and a resolution of each of the plurality of virtual cameras based on the determined user movement state; rendering images of each of the plurality of virtual cameras based on the controlled operation state and the controlled resolution; stitching the rendered images of the plurality of virtual cameras; and transmitting the stitched images to the user device.

The predetermined virtual space may be a virtual space created with three-dimensional graphic images generated by the server.

The plurality of virtual cameras may include: an up virtual camera facing an up-direction from the user location in the virtual space for capturing an up-image of the virtual space that the user looks upwards at the user location in the virtual space; a down virtual camera facing a down-direction from the user location in the virtual space for capturing a down-image that the user looks downward from the user location; a left virtual camera facing a left-direction from the user location in the virtual space for capturing a left image that the user looks left from the user location; a right virtual camera facing a right-direction from the user location in the virtual space for capturing a right image that the user looks right from the user location; a front virtual camera facing a front-direction from the user location in the virtual space for capturing a front image that the user looks front from the user location; and a back virtual camera facing a back-direction from the user location in the virtual space for capturing a back image that the user looks back from the user location.

The user tracking information may include at least one of a position value, a rotational velocity, an acceleration value, and an angular velocity.

The determining a user movement state may include: calculating a traveling speed of the user based on the user tracking information; and determining the user movement state as one of a walk-through state and a stay-still state based on the calculation result.

When the user movement state indicates a walk-through state, the back virtual camera may be controlled to be turned off.

When the user movement state indicates a walk-through state, at least one of resolutions of the up virtual camera, the down virtual camera, the left virtual camera, and the right virtual camera may be controlled to be lower than that of the front virtual camera.

When the user movement state indicates a walk-through state, at least one of resolutions of the up virtual camera, the down virtual camera, the left virtual camera, and the right virtual camera may be controlled to be in inverse proportion to a travelling speed of the user.

When the user movement state indicates a stay-still state, all of the up virtual camera, the down virtual camera, the left virtual camera, the right virtual camera, the front virtual camera, and the back virtual camera may be controlled to be turned on.

In accordance with another embodiment, a user device may be provided for providing a virtual reality experience server to a user. The user device may include a communication circuit configured to communicate with a server and at least one motion tracking device through a communication network; a memory configured to store information received from at least one of the server and motion tracking device and information generated by performing operations; and a processor configured to generate user tracking information that indicates a user movement state by controlling information from at least one of internal sensors and motion tracking devices and transmit the user tracking information to the server through the communication circuit, generate head tracking information that indicates a head movement state of a user using the internal sensors, receive a stitched image for a 360-degree image of a predetermined virtual space from the server; render a user-viewpoint image according to the head tracking information using the received stitched image, and display the rendered user-viewpoint image on a display.

The stitched image may be a stitched texture data generated by the server for enabling the user device to generate the 360-degree image of the predetermined virtual space.

The processor may be configured to: generate the 360-degree image of the virtual space by performing equirectangular texturing on a sphere mesh using the stitched image; and render stereo-pair images of a user's viewpoint in the 360-degree image of the virtual space whenever head movement is detected based on the head tracking information.

To render stereo-pair image, the processor may be configured to perform i) a stereo rendering operation based on the head tracking information and ii) a lens-warping operation on the rendering result.

The processor may be configured to: obtain a user's coordinate from the head movement information; determine a viewpoint of the virtual camera corresponding to the viewpoint of the user in the 360-degree image of the virtual space; and render images captured by the virtual camera based on the determined viewpoint, as the stereoscopic pair image.

In accordance with further another embodiment, a server may be provided for providing, by a server, a virtual reality service to a user device. The server may include a communication circuit configured to communicate with a user device and at least one motion tracking device through a communication network; a memory configured to store information received from at least one of the user device and motion tracking device and information generated by performing operations; and a processor configured to receive user tracking information from the user device through the communication circuit; generate a plurality of virtual cameras and set up the plurality of virtual cameras at predetermined locations corresponding to a user location in a predetermined virtual space based on the user tracking information; determine a user movement state based on the user tracking information; control an operation state and a resolution of each of the plurality of virtual cameras based on the determined user movement state; render images of each of the plurality of virtual cameras based on the controlled operation state and the controlled resolution; stitch the rendered images of the plurality of virtual cameras; and transmit the stitched images to the user device.

BRIEF DESCRIPTION OF THE DRAWINGS

FIG. 8 illustrates a 360-degree image generated through equirectangular texturing on a sphere mesh using a stitched images received from a server and a rendering process for rendering a stereoscopic image using a virtual camera in accordance with at least one embodiment.

FIG. 9 is a diagram for showing codes sets for controlling a virtual camera through setting up different parameter and attributes in accordance with at least one embodiment.

DETAILED DESCRIPTION OF EMBODIMENTS

In accordance with at least one embodiment, a VR experience service may be provided to a user through a user device and a server without significant interruption (e.g., significant transmission delay) in response to a user's movement. In particular, a server may create a stitched image of a 360-degree video of a predetermined virtual environment according to a user movement state (e.g., walk, run, stay-still) and transmit the stitched image to a user device. A user device may i) receive, from a server through a wireless link, a stitched image of a 360-degree video of a predetermined virtual environment which is dynamically changed according to a user movement state (e.g., walk, run, stay-still) and ii) render a stereoscopic image at a user's view-point which is dynamically changed according to a user's head movement, using the received stitched image of the 360-degree view of the predetermined virtual environment in accordance with at least one embodiment.

Figure 1:
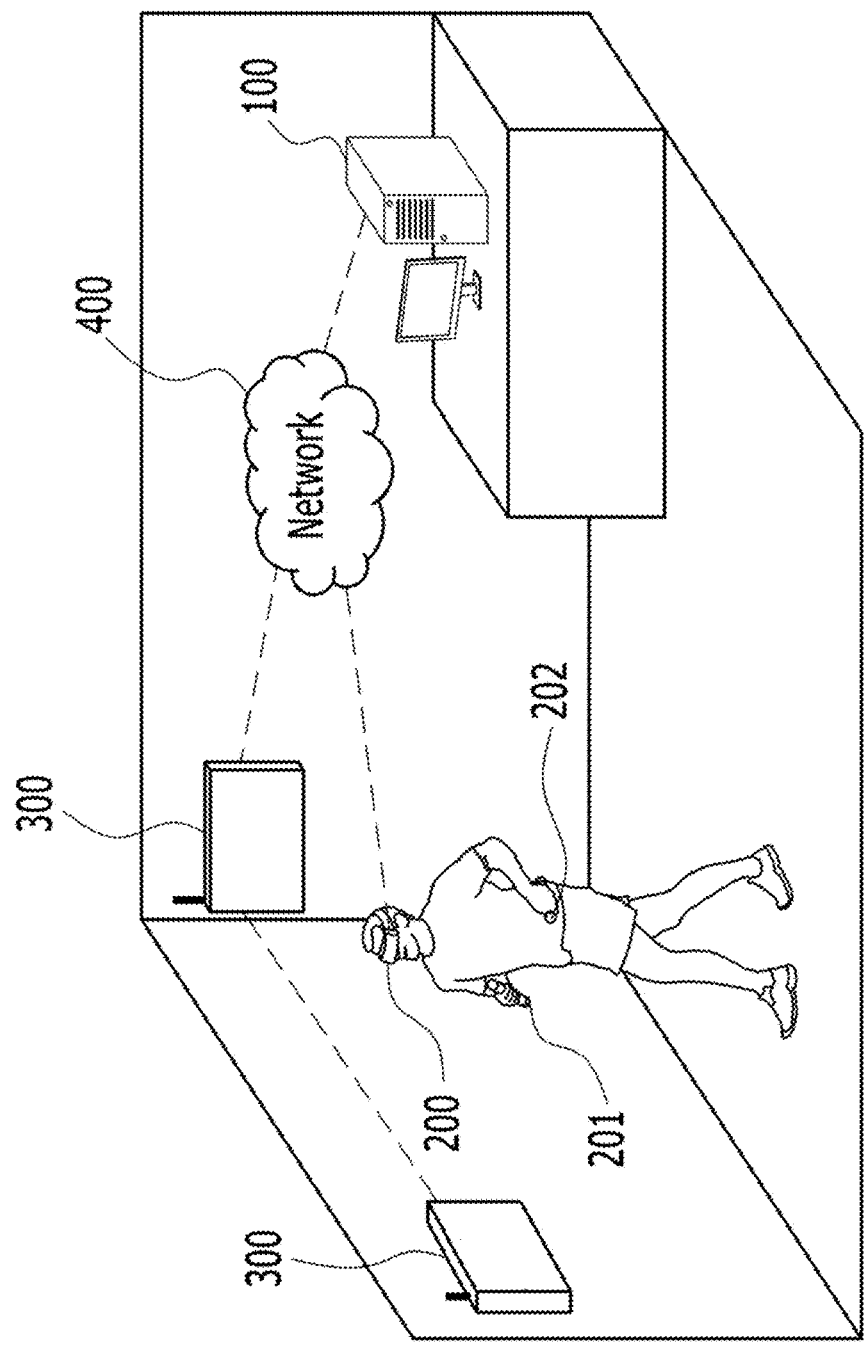
FIG. 1 illustrates a VR service system in accordance with at least one embodiment.

A virtual reality (VR) service system in accordance with at least one embodiment may provide such a virtual reality experience service to a user. Hereinafter, the VR service system will be described with reference to FIG. 1. FIG. 1 illustrates a VR service system in accordance with at least one embodiment.

Referring to FIG. 1, a VR service system may include server 100, user device 200, at least one tracking device 300, and communication network 400 in accordance with at least one embodiment. Such a VR service system may provide a VR experience service to a user. The VR experience service may be a service that creates a computer-generated virtual space using at least one of 3D graphic images and actual photographic images of a physical environment and enables a user to interactively experience the created virtual space (e.g., moving in the created virtual space or touch objects in the created virtual space) by providing a live stream of the virtual environment (e.g., virtual space) that is dynamically and constantly changed in response to feedback of a user in the virtual environment. The VR experience service may be referred to as a VR service or an augmented reality (AR) service.

In accordance with at least one embodiment, the VR experience service may be provided through server 100 and user device 200. As shown in FIG. 1, server 100 may be connected to user device 200 through communication network 400 (e.g., wireless communication link).

Server 100 may store a plurality of different virtual spaces. Such a virtual space may be a predetermined virtual environment that has previously created using at least one of photographical images of actual physical space and computer-generated 3D graphic images. Server 100 may store a plurality of virtual spaces in memory 130 and provide a list of the virtual spaces to user device 200 through a predetermined interface (e.g., corresponding application). For example, server 100 may provide a corresponding application in response to a request from user device 200 or upon registration of the VR experience service. User device 200 may download the corresponding application from server 100 upon the request and install the corresponding application therein. By the execution of the installed application, a wireless link may be formed between server 100 and user device 200, and a dedicated interface may be displayed on a display of user device 200 for enabling a user to access server 100 and use the VR experience service. In particular, server 100 may enable a user to select at least one in the list and provide a VR experience service in the selected virtual space through the dedicated interface.

To provide the VR experience service to user, server 100 may create a stitched image of a 360-degree image of a predetermined virtual space based on a user's location in the predetermined virtual space and user movements (e.g., walking, running, and stay still) and transmit the created stitched image of the 360-degree image of the predetermined virtual space to user device 200 using a media-streaming scheme in accordance with at least one embodiment.

That is, server 100 may virtually create a 360-degree image of the predetermined virtual space by i) setting up at least one of virtual cameras each directing (e.g., facing) different directions (e.g., view angle) in a user location of the predetermined virtual space, ii) rendering an image of the virtual space looking through each virtual camera as a captured image of each virtual camera, iii) stitching the rendered images of the virtual cameras for producing a 360-degree image of the virtual space, and iv) streaming the created 360-degree image to user device 200. The 360-degree image may be transmitted as a form of a stitched texture data, to user device 200.

To overcome a jittering problem and reduce a transmission latency, an operation state (e.g., on/off state) and an image resolution of each virtual camera may be dynamically determined based on the user movement state of a user in accordance with at least one embodiment. For example, server 100 may arrange (e.g., deploy) a plurality of virtual cameras or a virtual camera with multiple lenses (e.g., virtual created in software manner) at a predetermined location in the predetermined virtual space (e.g., virtual environment). The virtual cameras may be a virtual camera with multiple lenses each directing to a respective direction or each having a different view angle.

Each of the virtual cameras (e.g., each lens of the virtual camera) may face a designated direction, for example, up, down, left, right, front, and back. That is, each of the virtual cameras (e.g., each lens of the virtual camera) captures images of the predetermined virtual space in the designated direction (e.g., up, down, left, right, front, and back). Each of the virtual cameras represents a view-point of a user when the user is located at the virtual space. That is, a virtual camera facing an up-direction may capture an image that the user looks upwards, a virtual camera facing a down-direction may capture an image that the user looks downward, a virtual camera facing a left-direction may capture an image that the user looks left, a virtual camera facing a right-direction may capture an image that the user looks right, a virtual camera facing a front-direction may capture an image that the user looks front, and a virtual camera facing a back-direction may capture an image that the user looks back.

To determine positions of virtual cameras in the predetermined virtual space, server 100 may receive user tracking information from user device 200 and determine a user movement state (e.g., walking-through, running, or stay-still) based on the received user tracking information. In accordance with at least one embodiment, the user tracking information may be information collected, obtained, determined, measured when a user makes body movements (e.g., walk, run, or stay-still) and a traveling direction of the user using at least one of sensors 201 and 202 in user device 200 and at least one tracking device 300. That is, the user tracking information may indicate whether a user walks, runs, or stay still, a direction the user travels, and a speed of traveling.

Server 100 may differently and dynamically generate 360-degree images of the virtual space according to the user tracking information in accordance with at least one embodiment. For example, server 100 may determine a user movement state (e.g., walk, run, or stay-still) and control an operation state (e.g., on/off) of each virtual camera and a resolution of an image associated each virtual camera according to the determined user state. That is, server 100 may render an image of each virtual camera based on the determined resolution and operation state of the virtual camera. Then, server 100 may stitch a plurality of rendered images and transmit the stitched image to user device 200 in accordance with at least one embodiment.

In accordance with at least one embodiment, user device 200 may receive the stitched images (e.g., stitched texture data) for a 360-degree image of the virtual space from server 100, render a user-view point image and peripheral images using the received stitched images based on head tracking information of the user, and output the rendered images on a display. Since the rendering of the user-view point image and peripheral images (e.g., stereoscopic images) is performed in user device 200 independently using the stitched image received from server 100, the jittering caused by transmission latency may be significantly minimized. The head tracking information may be collected using at least one of inertial sensors 250 of user device 200.

User device 200 may be a head-mount device that provides a virtual reality (VR) environment to a user in accordance with at least one embodiment. User device 200 may be a stereoscopic head-mounted display that provides separate images for each eye, and stereo sound, and includes head motion tracking sensors (e.g., gyroscopes, accelerometers). However, embodiments of the present disclosure are not limited thereto. User device 200 may be a portable device (e.g., smart phone) capable of communication and displaying information and installed with a corresponding application that simulates a stereoscopic display.

In accordance with at least one embodiment, user device 200 may receive stitched images from server 100 through the media-streaming scheme and display images of the determined virtual space according to a user's view point. For example, user device 200 may receive a stitched image stream (e.g., stitched texture data) from server 100, create a 360-degree image of the virtual space through equirectangular texturing on a sphere mesh, render images of user's view-point in the virtual space (e.g., stereo pairs: images will be displayed on the stereoscopic head-mounted display), and output the rendered images through the stereoscopic head-mounted display) in accordance with at least one embodiment. The rendered image may be produced by performing i) a stereo rendering operation based on head tracking information (e.g., head movement of user's head) and ii) a lens-warping operation (e.g., barrel distortion), but the embodiments are not limited thereto. As described, user device 200 may receive the stitched texture data from server 100 and produce the rendered image to be displayed on corresponding display using the received stitched texture data based on the head tracking information collected through various sensors mounted on user device 200 in accordance with at least one embodiment. That is, such a rendered image to be displayed on corresponding display may be dynamically changed according to the head tracking information. User device 200 may directly produce the rendered image according to the head movement of the user in accordance with at least one embodiment. Furthermore, user device 200 does not request server 100 to re-render the images according to the head movement of the user. Therefore, it is possible to reduce and prevent the typical latency problem (e.g., jittering problem).

To collect the head tracking information, user device 200 may include a plurality of sensors, such as a location sensor, inertial sensors (e.g., accelerometer, gyroscope, MEMEs . . . ) and determine user's view points and positions through the plurality of sensors. Such head tracking information may be used in user device 200 for rendering the stereoscopic images to be displayed on the stereoscopic head mounted display using the stitched image received from server 100.

To collect the user tracking information, user device 200 may obtain information from at least one of motion tracking devices 300 and internal sensor 250 and transmit the user tracking information to server 100. The user tracing information may include at least one of a position value, a rotational velocity, an acceleration value, and an angular velocity. Such the user tracking information may be used to determine a position of at least one virtual camera in the virtual space and an operation state of each virtual camera.

In accordance with another embodiment, location tracking device 300 may track a location of a user and transmit the location information of the user to server 100 through communication network 400. Location tracking device 300 may include a red, green, blue (RGB) camera, an ultra sound sensor, and an infrared sensor, but the embodiments of the present disclosure are not limited thereto.

As shown in FIG. 1, constituent elements of the VR service system may be coupled through communication network 400. Communication network 400 may include, but not limited thereto, 3G, 4G, 5G, 3GPP, Long term evolution (LTE) network, world interoperability for microwave access (WIMAX), Wi-Fi, Bluetooth communication network, infrared communication network, ultra wave communication, visible light communication, Li-Fi, and likes.

As described, server 100 may provide a stitched image (e.g., stitched texture data) for a 360-degree image of the virtual space at a current location of a user in the virtual space according to the user tracking information in accordance with at least one embodiment. Hereinafter, a hardware structure and operations of server 100 will be described in detail with reference to FIG. 2 to FIG. 6.

Figure 2:
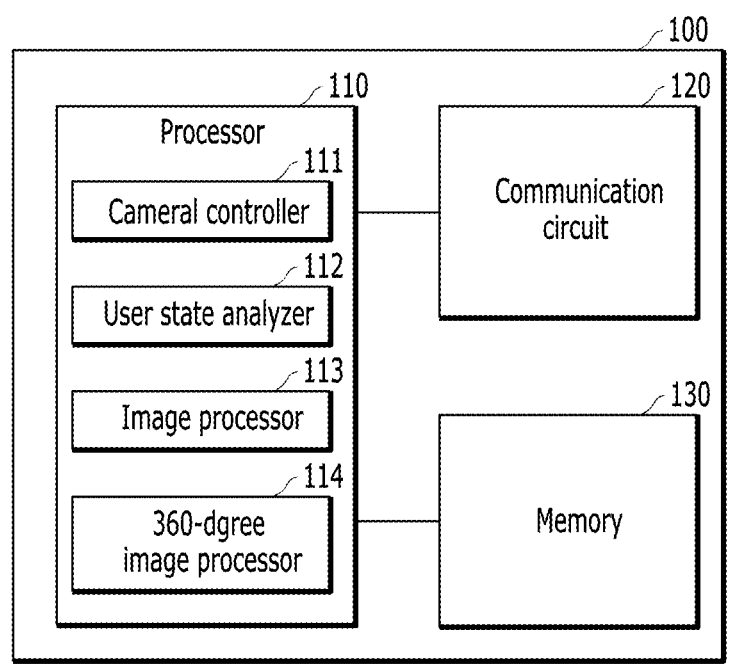
FIG. 2 illustrates a server in accordance with at least one embodiment.

FIG. 2 illustrates a server in accordance with at least one embodiment. Referring to FIG. 2, server 100 may be a computer or a group of computers interconnected each other that manages and controls operations for providing a VR experience service to user device 200 using communication network 400 without incurring excessive delay in accordance with at least one embodiment.

Server 100 may include a memory, a memory controller, at least one processor (e.g., central processing unit: CPU), peripheral interfaces, input/output (I/O) subsystems, display device, an input device, and a communication circuit. The communication circuit may communicate with other entities including user devices through a mobile communication network. The communication circuit may include at least one module (or at least one circuit) for communicating with other entities through a communication network. Herein, the communication network may include a variety of communication networks such as a wireless communication network and a wired communication network. For example, the communication network may include a wideband code division multiple access (WCDMA) network, a microwave access (WiMAX) network, a wireless fidelity (WiFi) network, a long term revolution (LTE) network, x digital subscriber line (xDSL) network, a hybrid fiber-coaxial (HFC) network, a satellite network, a global system for mobile communication (GSM) edge radio access network (GERAN), a universal terrestrial radio access network (UTRAN), an evolved universal terrestrial radio access network (E-UTRAN), a wireless local area network (W-LAN), a public switched telephone network (PSTN), an integrated services for digital network (ISDN), an international mobile telecommunications (IMT)-2000 network, a wired area network (WAN), a local area network (LAN), a metropolitan area network (MAN), a cable television (CATV), third generation partnership project core networks (3GPP-CNs), an European telecommunications standards institute telecommunication & internet converged service & protocols for advanced networks core network (ETSI TISPAN CN), a 3GPP2 CN, a machine to machine (M2M) network, a broadcast network, a radio frequency identification (RFID) network, a near field communication (NFC) network, a ultra-wideband (UWB) network, a Bluetooth communication network, but the present disclosure is not limited thereto. In at least one embodiments, communication circuit 1300 may include at least one of a wireless communication circuit and a wired communication circuit. Herein, the wireless communication circuit and wired communication may be separately or integrally configured.

Communication circuit 120 may communicate with other entities including user device 200 and at least one motion tracking device 300 through communication network 140. Communication circuit 120 may include at least one module (or at least one circuit) for communicating with other entities through a communication network. Herein, the communication network may include a variety of communication networks such as a wireless communication network and a wired communication network. For example, the communication network may include a wideband code division multiple access (WCDMA) network, a microwave access (WiMAX) network, a wireless fidelity (Wi-Fi) network, a long term revolution (LTE) network, x digital subscriber line (xDSL) network, a hybrid fiber-coaxial (HFC) network, a satellite network, a global system for mobile communication (GSM) edge radio access network (GERAN), a universal terrestrial radio access network (UTRAN), an evolved universal terrestrial radio access network (E-UTRAN), a wireless local area network (W-LAN), a public switched telephone network (PSTN), an integrated services for digital network (ISDN), an international mobile telecommunications (IMT)-2000 network, a wired area network (WAN), a local area network (LAN), a metropolitan area network (MAN), a cable television (CATV), third generation partnership project core networks (3GPP-CNs), an European telecommunications standards institute telecommunication & internet converged service & protocols for advanced networks core network (ETSI TISPAN CN), a 3GPP2 CN, a machine to machine (M2M) network, a broadcast network, a radio frequency identification (RFID) network, a near field communication (NFC) network, a ultra-wideband (UWB) network, a Bluetooth communication network, but the present disclosure is not limited thereto. In at least one embodiments, communication circuit 120 may include at least one of a wireless communication circuit and a wired communication circuit. Herein, the wireless communication circuit and wired communication may be separately or integrally configured.

Memory 130 may store a variety of information, such as software programs for operation, data received from other entities, and data generated as result of operations. That is, memory 130 may store an operation system data, applications, and related data, received from other entities through a variety of communication media (e.g., communication networks). Memory 130 may include at least one of an internal memory and an external memory according to embodiments. For example, memory 130 may be a flash memory, hard disk, multimedia card micro memory, SD or XD memory, Random Access Memory (RAM), Static Random-Access Memory (SRAM), Read-Only Memory (ROM), Programmable Read-Only Memory (PROM), Electrically Erasable Programmable Read-Only Memory (EEPROM), magnetic memory, magnetic disk, or optical disk, a SD card, a USB memory, but is not limited thereto.

Processor 110 may perform or control overall operation of server 100. For example, processor 110 may be a central processing circuitry that controls constituent elements (e.g., memory, communication circuit, etc.) of server 100 and/or performs a variety of operations (or functions) of server 100. Processor 110 may be a group of multiple processors.

Processor 110 may perform operations for virtually creating a 360-degree image of the predetermined virtual space and transmitting the created 360-degree image to user device 200 through communication circuit 120 in accordance with at least one embodiment. As described, the virtual space may be a predetermined virtual environment that has previously created using at least one of photographical images of actual physical space and computer-generated 3D graphic images. Server 100 may store a plurality of virtual spaces in memory 130 and provide a list of the virtual spaces to user device 200 through a predetermined interface (e.g., corresponding application). Server 100 may enable a user to select at least one in the list and provide a VR experience service in the selected virtual space through the predetermined interface provided by executing the corresponding application installed in user device 200.

To perform such operations, processor 110 may further include at least one of sub-processors which are implemented in a hardware manner or in a software manner. For example, processor 110 may include camera controller 111, user state analyzer 112, image rendering processor 113, and 360-degree image processor 114, but the embodiments of the present disclosure are not limited thereto.

Camera controller 111 may perform operations for setting up at least one of virtual cameras each directing (e.g., facing) different directions (e.g., view angle) in a user location of the predetermined virtual space. In accordance with at least one embodiment, the predetermined virtual space is a computer-generated virtual environment created using 3D graphic images. For example, six virtual cameras or a virtual camera with six lenses may be created and positioned in a predetermined location of the virtual space based on a location of a user in the virtual space (e.g., the user user tracking information). The virtual cameras may be a virtual camera with multiple lenses each directing to a respective direction or each having a different view angle. Each of the virtual cameras (e.g., each lenses of the virtual camera) may face a designated direction, for example, up, down, left, right, front, and back. That is, each of the virtual cameras (e.g., each lenses of the virtual camera) captures images of the predetermined virtual space in the designated direction (e.g., up, down, left, right, front, and back). Each of the virtual cameras represents a view-point of a user when the user is located at the virtual space.

Figure 3:
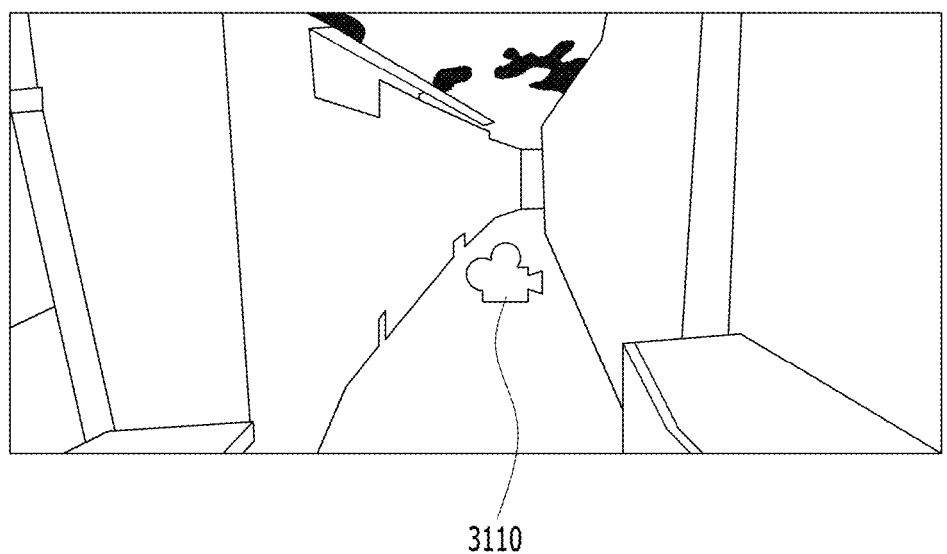
FIG. 3 is a diagram for describing setting up virtual cameras or a virtual camera with multiple lenses at predetermined location in a predetermined virtual space in accordance with at least one embodiment.
Figure 4:
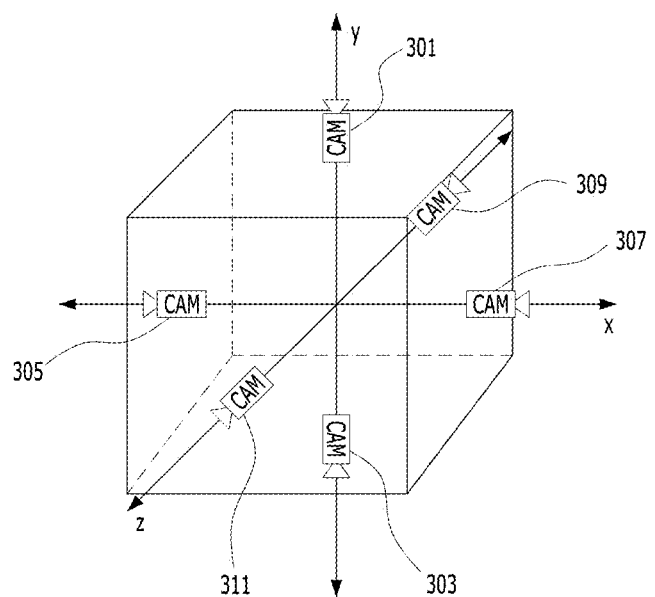
FIG. 4 is a diagram illustrating six virtual cameras each directing six different directions in accordance with at least one embodiment.

FIG. 3 is a diagram for describing setting up virtual cameras or a virtual camera with multiple lenses at predetermined location in a predetermined virtual space in accordance with at least one embodiment, and FIG. 4 is a diagram illustrating six virtual cameras each directing six different directions in accordance with at least one embodiment. As shown in FIG. 3 and FIG. 4, camera controller 111 may determine position 3100 of a user in predetermined virtual space 3000 based on the user tracking information and create six virtual cameras 301 to 311 at determined position 3100 in the virtual space 3000. For example, camera controller 111 may create i) up virtual camera 301 facing an up-direction for capturing an image that the user looks upwards, ii) down virtual camera 303 facing a down-direction for capturing an image that the user looks downward, iii) left virtual camera 305 facing a left-direction for capturing an image that the user looks left, v) right virtual camera 307 facing a right-direction for capturing an image that the user looks right, vi) front virtual camera 309 facing a front-direction for capturing an image that the user looks front, and vii) back virtual camera 311 facing a back-direction for capturing an image that the user looks back.

Referring back to FIG. 2, camera controller 111 may determine camera arrangement rules based on a type and a size of virtual space 3000. For example, camera controller 111 may determine a distance between virtual cameras based on a reference area and an aspect ratio of a virtual space.

Server 100, through communication circuit 120, may receive user tracking information from at least one of motion tracking device 300 and user device 200 in accordance with at least one embodiment. The user tracking information may be information collected, obtained, determined, and measured whenever the user makes body movements which are different from head movements and a traveling direction of the user using at least one of sensors 250 in user device 200 and at least one tracking device 300. That is, the user tracking information may indicate whether a user walks, runs, or stay still, a direction the user travels, and a speed of traveling. The user tracking information is also different from head tracking information that is information collected, obtained, determined, and measure when the user makes head movements.

After user device 200 accesses server 100 through a wireless communication link, server 100 may request the user tracking information to at least one of user device 200 and user tracking device 300 and receive the user tracking information in real-time or at a predetermined interval from at least one of user device 200 and user tracking device 300.

User state analyzer 112 may analyze the received user tracking information and determine a position of a user in the predetermined virtual space and a user movement state based on the received user tracking information (e.g., user tracking information: walking-through, running, or stay-still). For example, user state analyzer 112 may extract a position value of a user from the received user tracking information which is continuously received from user device 200 and user tracking device 300 and determine the user movement state by comparing a current position value and previous position values and measuring a speed of traveling. In particular, based on the difference between the current position value and the previous position values and the speed of traveling, user state analyzer 112 may determine a user movement state as one of "walking-through," "running," and "stay-still," but embodiments of the present disclosure are not limited thereto.

Based on the determined user movement state, camera controller 111 may individually and separately control the virtual cameras 301 to 311 to capture images looking through the respect virtual cameras 301 to 311 in accordance with at least one embodiment. For example, camera controller 111 may control an operation state and a resolution of each virtual camera according to the determined user movement state. In particular, when the determined user movement state is "walking-through" or "running," camera controller 111 may control back virtual camera 311 to be off (e.g., the operation state of back virtual camera 311 to be off) because it is very difficult and almost impossible to a user for looking back while the user walks or runs forward. Since back virtual camera 311 is off, back image is not rendered. Furthermore, camera controller 111 may control resolutions of at least one of right, left, up, and down virtual cameras to be comparatively lower than front virtual camera 301.

In addition, camera controller 111 may control resolutions of virtual cameras based on the traveling speed of a user. For example, when the user runs at a comparatively fast speed, camera controller 111 may control resolutions of at least one of right, left, up, and down virtual cameras to be relatively lower than i) front virtual camera 301 and ii) the resolutions set for walking or running at a slower speed.

When the determined user movement state is "stay-still," camera controller 111 may control all virtual camera 301 to 311 to be on and control resolutions of all virtual cameras to be a predetermined resolution level (e.g., normal resolution).

In accordance with at least one embodiment, virtual cameras may be implemented as a series of code sets controlled through parameters and attributes. Camera controller 111 may generate the parameters and attributes of each virtual camera based on the determined user movement state and control the operation states and the resolutions of the virtual cameras by executing the code sets of virtual cameras using the generated parameters and attributes. For example, FIG. 9 is a diagram for showing codes sets for controlling a virtual camera through setting up different parameters and attributes. As shown in FIG. 9, virtual cameras of server 100 may be controlled by executing similar code sets with parameters and attributes.

Image rendering processor 113 may perform operations for rendering an image looking through each virtual camera as a captured image of each virtual camera by executing virtual cameras 301 to 311 with the determined parameters and attributes (e.g., operation states and resolutions). The rendered image of each virtual camera is an image of a virtual space, which the user can look through a view finder of the virtual camera. That is, the rendered image of each virtual camera is a photographic image of a virtual space, which can be captured by a corresponding virtual camera located at a determined position and facing a designated direction based on the user tracking information.

In accordance with at least one embodiment, image rendering processor 113 may render six images: i) up-image of up virtual camera 301 facing an up-direction from the user location in the virtual space, ii) down-image of down virtual camera 303 facing a down-direction from the user location in the virtual space, iii) left image of left virtual camera 305 facing a left-direction from the user location in the virtual space, v) right image of right virtual camera 307 facing a right-direction from the user location in the virtual space, vi) front image of front virtual camera 309 facing a front-direction from the user location in the virtual space, and vii) back image of back virtual camera 311 facing a back-direction from the user location in the virtual space.

As described, according to the user movement state, the number of images and a resolution of each image may be changed. For example, when the determined user movement state is "walking-through" or "running," image rendering processor 113 may create five images because back virtual camera 311 is controlled to be off (e.g., the operation state of back virtual camera 311 to be off). Furthermore, image rendering processor 113 may generate at least one of right, left, up, and down images to be comparatively lower than the front image and do not generate a back image.

In addition, when the user runs at a comparatively fast speed, image rendering processor 113 may generate at least one of right, left, up, and down images to have a resolution relatively lower than i) front image and ii) the resolutions of images for walking or running at a slower speed.

When the determined user movement state is "stay-still," image rendering processor 113 may generate all six images of virtual camera 301 to 311 with a predetermined reference resolution level (e.g., normal resolution).

360-degree image processor 114 may perform operations for stitching the rendered images of the virtual cameras using a predetermined stitching algorithm for producing a 360-degree image of the virtual space in accordance with at least one embodiment. For example, 360-degree image processor 114 may stitch six images: i) up-image captured from up virtual camera 301 facing an up-direction from the user location in the virtual space, ii) down-image captured from down virtual camera 303 facing a down-direction from the user location in the virtual space, iii) left image captured from left virtual camera 305 facing a left-direction from the user location in the virtual space, v) right image captured from right virtual camera 307 facing a right-direction from the user location in the virtual space, vi) front image captured from front virtual camera 309 facing a front-direction from the user location in the virtual space, and vii) back image captured from back virtual camera 311 facing a back-direction from the user location in the virtual space.

Figure 5:
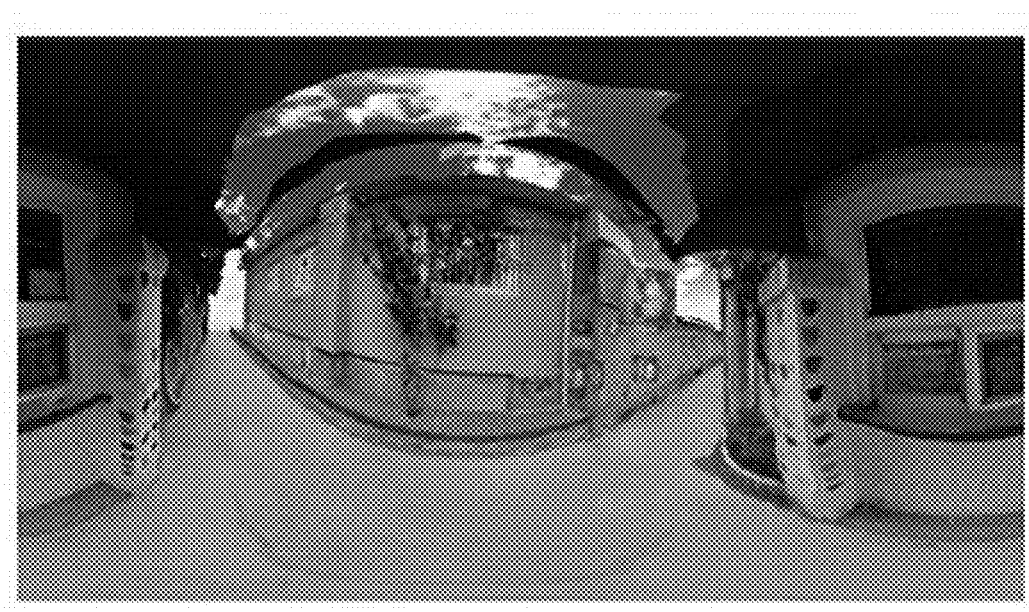
FIG. 5 illustrates a stitched image for a 360-degree image of a virtual space and streamed to a user device in accordance with at least one embodiment.

For example, the stitched images are shown in FIG. 5. FIG. 5 illustrates a stitched image made of images captured from virtual cameras positioned in a virtual space in accordance with at least one embodiment. Such a stitched image may be used to provide a 360-degree image of the virtual space.

In accordance with at least one embodiment, the data amount of the stitched image may be smaller than that of a typical stitched image for 360-degree image because at last one of six images is not included and has a less resolution than others. Accordingly, a transmission latency for transmitting the stitched image from server 100 to user device 200 may be significantly reduced in accordance with at least one embodiment. For example, when the determined user movement state is "walking-through" or "running," the created stitched image may include five images because back image is not rendered. Furthermore, the stitched image may include at least one of right, left, up, and down images having resolutions comparatively lower than the front image. In addition, when the user runs at a comparatively fast speed, image rendering processor 113 may generate at least one of right, left, up, and down images to have a resolution relatively lower than i) front image and ii) the resolutions of images for walking or running at a slower speed.

When the determined user movement state is "stay-still," image rendering processor 113 may generate all six images of virtual camera 301 to 311 with a predetermined reference resolution level (e.g., normal resolution).

Communication circuit 120 may transmit the stitched image to user device 200 through communication network 400. For example, communication circuit 120 may stream the stitched image (e.g., the created 360-degree image) to user device 200 using a predetermined media-streaming scheme. That is, the 360-degree image of the virtual space at the user's location and view-points may be transmitted as a form of a stitched texture data, to user device 200.

As described, server 100 may set up at least one of virtual cameras each directing (e.g., facing) different directions (e.g., view angle) in a user location of the predetermined virtual space, render an image of the virtual space looking through each virtual camera as a captured image of each virtual camera by individually controlling each camera with different resolution according to the user tracking information, stitch the rendered images of the virtual cameras for producing a 360-degree image of the virtual space, and stream the created 360-degree image to user device 200 in a form of a stitched texture data. As described, FIG. 5 illustrates the stitched image being streamed to user device 200. That is, server 100 may generate the stitched image smaller than that of a typical stitched image for a 360-degree image according to the user movement state because at last one of six images is not included and has a less resolution than others. Accordingly, a transmission latency for transmitting the stitched image from server 100 to user device 200 may be significantly reduced in accordance with at least one embodiment.

Figure 6:
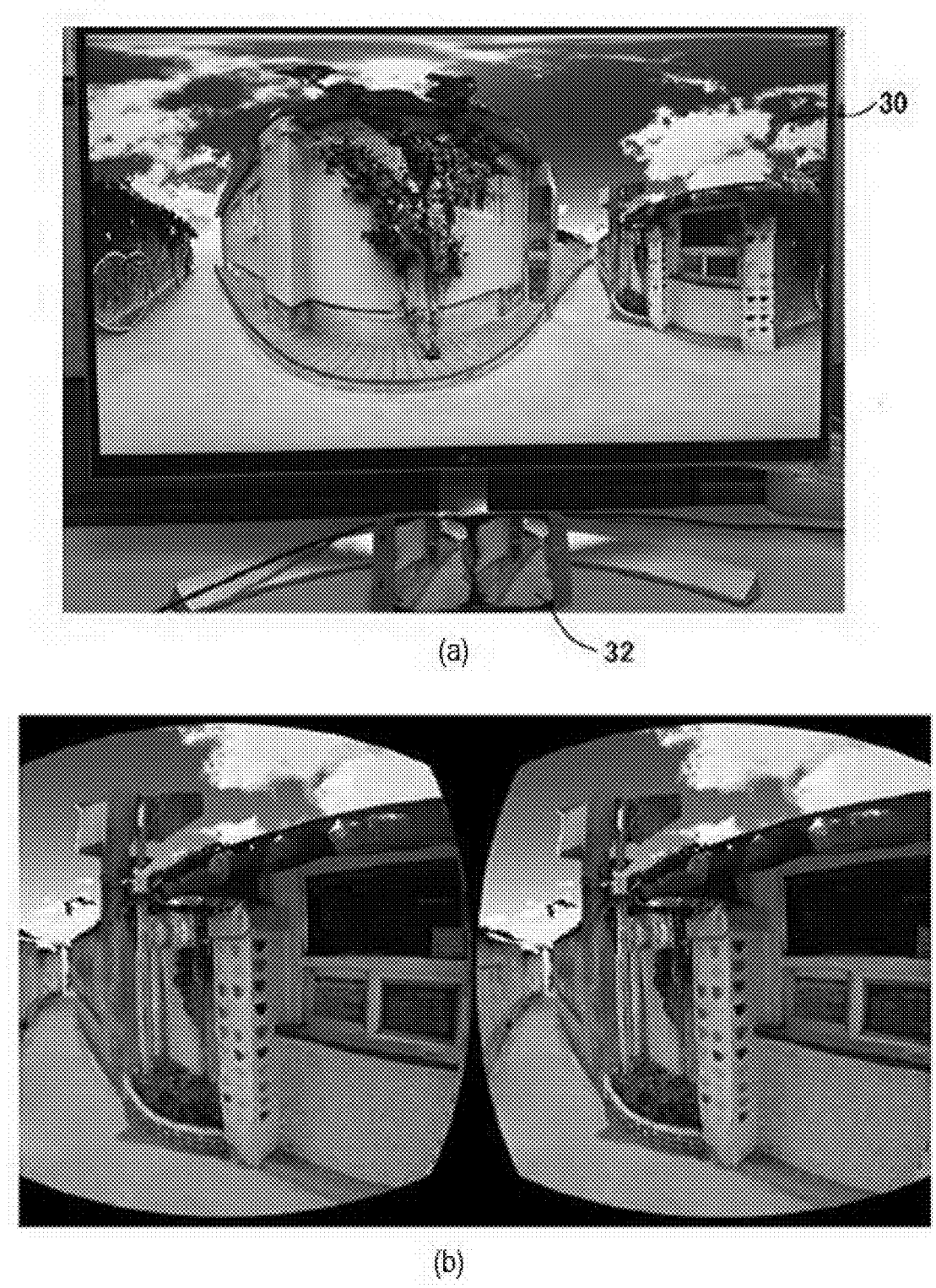
FIG. 6 illustrates a stitched image received from a server and a user-view point image (e.g., stereoscopic images) generated by a user device using the stitched image from the server in accordance with at least one embodiment.

As described, user device 200 may receive the stitched images (e.g., 360-degree image of the virtual space in a form of stitched texture data) from server 100, render a user-view point image and peripheral images using the received stitched images based on head tracking information, and output the rendered images on a display. FIG. 6 includes a diagram (a) that shows a stitched image 30 received from a server, which is displayed on a monitor as it is, and a diagram (b) that shows a user-view point image 32 (e.g., stereoscopic images) generated by a user device using the stitched image from the server and displayed on a typical monitor of a user device as it is in accordance with at least one embodiment. Since the rendering of the user-view point image and peripheral images (e.g., stereoscopic images) is performed in user device 200 independently using 360-degree image of the virtual space received from server 100, the jittering caused by transmission latency may be significantly minimized. The head tracking information may be collected using inertial sensors of user device 200. Hereinafter, such user device 200 will be described in more detail with reference to FIG. 7 to FIG. 10.

Figure 7:
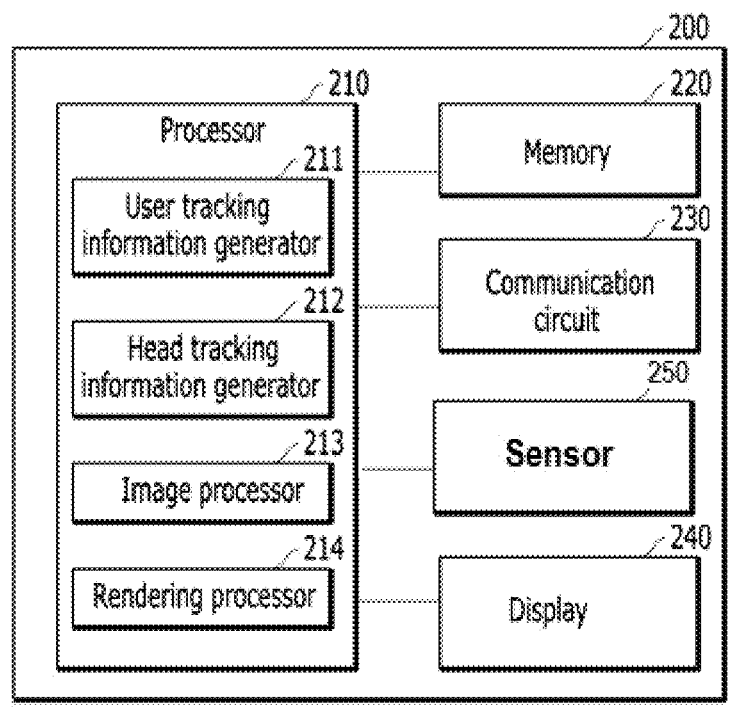
FIG. 7 is a diagram illustrating a user device in accordance with at least one embodiment.

FIG. 7 is a diagram illustrating a user device in accordance with at least one embodiment. Referring to FIG. 7, user device 200 may receive the stitched images (e.g., 360-degree image of the virtual space in a form of stitched texture data) from server 100, render a user-view point image and peripheral images based on head tracking information using the received stitched images, and output the rendered images on a display (e.g., stereoscopic display). Since the rendering of the user-view point image and peripheral images (e.g., stereoscopic images) is performed in user device 200 independently using 360-degree image of the virtual space received from server 100, the jittering caused by transmission latency may be significantly minimized. The head tracking information may be collected using inertial sensors of user device 200.

User device 200 may be a head-mount device that provides virtual reality (VR) to a user in accordance with at least one embodiment. User device 200 may be a stereoscopic head-mounted display that provides separate images for each eye, stereo sound, and head motion tracking sensors (e.g., gyroscopes, accelerometers). However, embodiments of the present disclosure are not limited thereto. User device 200 may be a portable device (e.g., smart phone) capable of communication and displaying information and installed with a corresponding application that simulates a stereoscopic display.

To collect the head tracking information, user device 200 may include a plurality of sensors 250, such as a location sensor, inertial sensors (e.g., accelerometer, gyroscope, MEMEs . . . ) and measure user's view point and positions through the plurality of sensors. Such head tracking information may be used in user device 200 for rendering the stereoscopic images to be displayed on the stereoscopic head mounted display.

To collect the user tracking information, user device 200 may obtain information from motion tracking devices 300 and transmit the user tracking information to server 100. The user tracing information may include at least one of a position value, a rotational velocity, an acceleration value, and an angular velocity. Such the user tracking information may be used to determine a position of at least one virtual camera in the virtual space and an operation state of each virtual camera.

User device 200 may include processor 210, memory 220, communication circuit 230, display 240, and sensor unit 250. That is, user device 200 may include a memory, a memory controller, at least one processor (e.g., central processing unit: CPU), peripheral interfaces, input/output (I/O) subsystems, display device, an input device, and a communication circuit.

Communication circuit 220 may communicate with other entities including server 100 and tracking device 300 through a communication network 400. Communication circuit 220 may include at least one module (or at least one circuit) for communicating with other entities through a communication network. Herein, the communication network may include a variety of communication networks such as a wireless communication network and a wired communication network. For example, the communication network may include a wideband code division multiple access (WCDMA) network, a microwave access (WiMAX) network, a wireless fidelity (WiFi) network, a long term revolution (LTE) network, x digital subscriber line (xDSL) network, a hybrid fiber-coaxial (HFC) network, a satellite network, a global system for mobile communication (GSM) edge radio access network (GERAN), a universal terrestrial radio access network (UTRAN), an evolved universal terrestrial radio access network (E-UTRAN), a wireless local area network (W-LAN), a public switched telephone network (PSTN), an integrated services for digital network (ISDN), an international mobile telecommunications (IMT)-2000 network, a wired area network (WAN), a local area network (LAN), a metropolitan area network (MAN), a cable television (CATV), third generation partnership project core networks (3GPP-CNs), an European telecommunications standards institute telecommunication & internet converged service & protocols for advanced networks core network (ETSI TISPAN CN), a 3GPP2 CN, a machine to machine (M2M) network, a broadcast network, a radio frequency identification (RFID) network, a near field communication (NFC) network, a ultra-wideband (UWB) network, a Bluetooth communication network, but the present disclosure is not limited thereto. In at least one embodiments, communication circuit 230 may include at least one of a wireless communication circuit and a wired communication circuit. Herein, the wireless communication circuit and wired communication may be separately or integrally configured.

Memory 220 may store a variety of information, such as software programs for operation, data received from other entities, and data generated as result of operations. That is, memory 220 may store an operation system data, applications, and related data, received from other entities through a variety of communication media (e.g., communication networks). Memory 220 may include at least one of an internal memory and an external memory according to embodiments. For example, memory 140 may be a flash memory, hard disk, multimedia card micro memory, SD or XD memory, Random Access Memory (RAM), Static Random-Access Memory (SRAM), Read-Only Memory (ROM), Programmable Read-Only Memory (PROM), Electrically Erasable Programmable Read-Only Memory (EEPROM), magnetic memory, magnetic disk, or optical disk, a SD card, a USB memory, but is not limited thereto.

Processor 210 may perform or control overall operation of user device 200. For example, processor 210 may be a central processing circuitry that controls constituent elements (e.g., memory, communication circuit, etc.) of user device 200 and/or performs a variety of operations (or functions) of user device 200. Processor 210 may be a set of multiple processors.

In accordance with at least one embodiment, processor 210 may include sub-processors, for example, user tracking information generator 211, head tracking information generator 212, image processor 213, and rendering processor 214.

User tracking information generator 211 may perform operations for collecting information for tracking a user's location and generating user tracking information using the collected information in accordance with at least one embodiment. For example, user tracking information generator 211 may monitor a location value (e.g., coordinate value) of user device 200 using a location sensor (e.g., GPS sensor) in user device 200. User tracking information generator 211 may transmit the generated user tracking information to server 100 through communication circuit 230 at a regular interval, whenever the user tracking information is generated, or when a user's location is changed.

Head tracking information generator 212 may perform operations for collecting information for tracking a user's head movement and generating head tracking information using the collected information in accordance with at least one embodiment. For example, user tracking information generator 211 may measure head motions (e.g., rotational velocity, angular velocity, acceleration value) of user device 200 using inertial sensors (e.g., head motion tracking sensors: gyroscopes, accelerometers) in user device 200.

Processor 210 may perform operations for receiving a stitched image stream (e.g., stitched texture data) from server 100 through communication circuit 230.

Image processor 213 may perform operations for creating a 360-degree image of the virtual space through equirectangular texturing on a sphere mesh. FIG. 8 illustrates a 360-degree image generated through equirectangular texturing on a sphere mesh using the received stitched images from server 100.

Rendering processor 214 may perform operations for rendering images of user's viewpoint in the virtual space (e.g., stereo pairs: images will be displayed on the stereoscopic head-mounted display) and outputting the rendered images through the stereoscopic head-mounted display) in accordance with at least one embodiment. For example, rendering processor 214 may collect a 3D coordinate and a directional coordinate in the virtual space using the location sensor and the inertia sensor and render stereo pairs corresponding to a user's view point from the 360-degree image of the virtual space.

Furthermore, rendering processor 214 may detect head movement and render images of user's viewpoint in the virtual space from the 360-degree image which is generated at user device 200. FIG. 8 illustrates a 360-degree image generated through equirectangular texturing on a sphere mesh using a stitched images received from a server and a rendering process for rendering a stereoscopic image using a virtual camera.

In particular, the rendered image may be produced by performing i) a stereo rendering operation based on head tracking information (e.g., head movement of user's head) and ii) a lens-warping operation (e.g., barrel distortion), but the embodiments are not limited thereto. As described, user device 200 may receive the stitched texture data from server 100 and produce the rendered image to be displayed on corresponding display using the received stitched texture data based on the head tracking information collected through various sensors mounted on user device 200 in accordance with at least one embodiment. That is, such a rendered image to be displayed on corresponding display may be dynamically changed according to the head tracking information. Since user device 200 may directly produce the rendered image, it is possible to reduce and prevent the typical latency problem (e.g., jittering problem).

Rendering processor 214 may create a virtual camera at a user's location in the 360-degree image (e.g., equirectangular textured sphere mesh) according to the collected user's coordinate, control a viewpoint (e.g., photographic direction, viewfinder direction) of the virtual camera corresponding to the viewpoint of the user in the 360-degree image, and render images of the virtual camera. Such operation is performed whenever head movement is detected. FIG. 8 is a diagram for describing such operations for creating a virtual camera at a user's location in the 360-degree image according to the collected user's coordinate, controlling a viewpoint (e.g., photographic direction, viewfinder direction) of the virtual camera corresponding to the viewpoint of the user in the 360-degree image, and rendering images of the virtual camera.

Display 240 may receive the rendered image (e.g., stereoscopic image) and output the rendered images.

Figure 10:
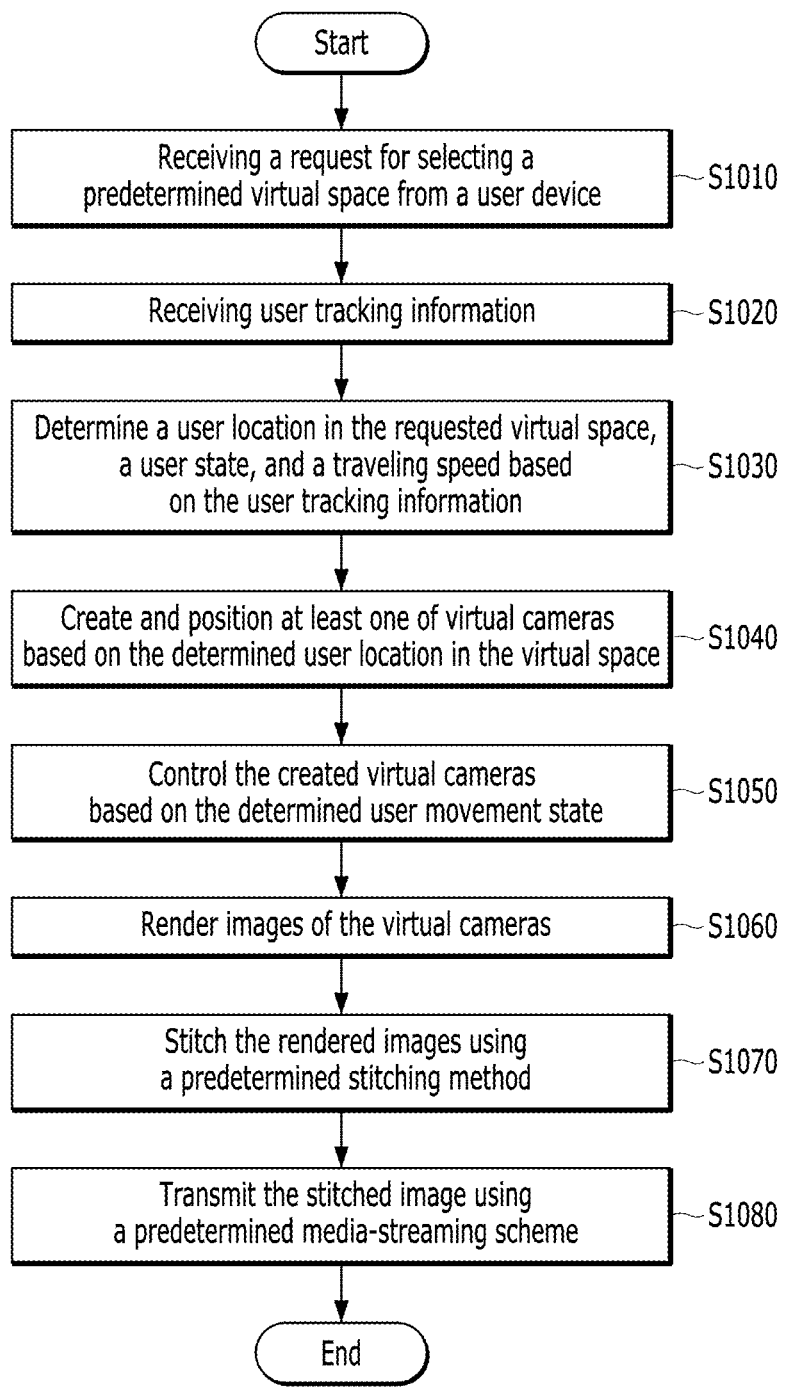
FIG. 10 is a flowchart illustrating operations of a server for providing a VR experience server in accordance with at least one embodiment.

Hereinafter, operations of server 100 will be described with reference to FIG. 10. FIG. 10 is a flowchart illustrating operations of a server for providing a VR experience server in accordance with at least one embodiment. Referring to FIG. 10, a request for selecting a predetermined virtual space may be received from user device 200 at step S1010. As described, server 100 virtually creates a 360-degree image of the predetermined virtual space and transmits the created 360-degree image to user device 200 through communication circuit 120 in accordance with at least one embodiment. As described, the virtual space may be a predetermined virtual environment that has previously created using at least one of photographical images of actual physical space and computer-generated 3D graphic images. A plurality of virtual spaces may be previously created and stored in memory 130 and a list of the virtual spaces may be provided to user device 200 in response to a request through a predetermined interface (e.g., corresponding application). A user may be enabled to select at least one in the list and provide a VR experience service in the selected virtual space through the predetermined interface generated by a corresponding application installed in user device 200.

At step S1020, user tracking information may be received at a regular interval. Through communication circuit 120, user tracking information may be received from at least one of motion tracking device 300 and user device 200 in accordance with at least one embodiment. The user tracking information may be information collected, obtained, determined, measured according to variation in user's body movements and traveling direction of a user using at least one of sensors in user device 200 and at least one tracking device 300. That is, the user tracking information may indicate whether a user walks, runs, or stay still, a direction the user travels, and a speed of traveling. After user device 200 accesses server 100 through a wireless communication link, server 100 may request the user tracking information to at least one of user device 200 and user tracking device 300 and receive the user tracking information in real-time or at a predetermined interval from at least one of user device 200 and user tracking device 300.

At step S1030, a user location in the requested virtual space, a user state, and a traveling speed may be determined based on the user tracking information. For example, the received user tracking information may be analyzed, and a position of a user and a user movement state based on the received user tracking information (e.g., user tracking information: walking-through, running, or stay-still) may be determined. In particular, a position value of a user may be extracted from the received user tracking information which is continuously received from user device 200 and user tracking device 300. The user movement state may be determined by comparing a current position value and previous position values and measuring a speed of traveling. In particular, based on the difference between the current position value and the previous position values and the speed of traveling, a user movement state may be determined as one of "walking-through," "running," and "stay-still," but embodiments of the present disclosure are not limited thereto.

At step S1040, based on the determined user location, at least one of virtual cameras may be created and positioned in the virtual space. For example, each virtual camera may direct different directions at the determined user location of the predetermined virtual space. As described, the predetermined virtual space is a computer generated virtual environment created using 3D graphic images. For example, six virtual cameras or a virtual camera with six lenses may be created and positioned in the determined location of the requested virtual space based on a location of a user in the virtual space, which is determined based on the user user tracking information. The virtual cameras may be a virtual camera with multiple lenses each directing to a respective direction or each having a different view angle. Each of the virtual cameras (e.g., each lenses of the virtual camera) may face a designated direction, for example, up, down, left, right, front, and back. That is, each of the virtual cameras (e.g., each lenses of the virtual camera) captures images of the predetermined virtual space in the designated direction (e.g., up, down, left, right, front, and back). Each of the virtual cameras represents a view-point of a user when the user is located at the virtual space.

In particular, as shown in FIG. 3 and FIG. 4, at step S1050, position 3100 of a user in predetermined virtual space 3000 may be determined based on the user tracking information, and six virtual cameras 301 to 311 may be created at determined position 3100 in the virtual space 3000. For example, camera controller 111 may create i) up virtual camera 301 facing an up-direction for capturing an image that the user looks upwards, ii) down virtual camera 303 facing a down-direction for capturing an image that the user looks downward, iii) left virtual camera 305 facing a left-direction for capturing an image that the user looks left, v) right virtual camera 307 facing a right-direction for capturing an image that the user looks right, vi) front virtual camera 309 facing a front-direction for capturing an image that the user looks front, and vii) back virtual camera 311 facing a back-direction for capturing an image that the user looks back. Furthermore, at the step S1050, camera arrangement rules may be determined based on a type and a size of a virtual space. For example, a distance between virtual cameras may be determined based on a reference area and an aspect ratio of a virtual space.

At step S1050, the created virtual cameras may be controlled based on the determined user movement state. As described, the user movement state is determined at the step S1030. Based on the determined user movement state, virtual cameras 301 to 311 may be individually and separately controlled to capture images looking through the respect virtual cameras 301 to 311 in accordance with at least one embodiment. For example, an operation state and a resolution of each virtual camera may be controlled according to the determined user movement state. In particular, when the determined user movement state is "walking-through" or "running," back virtual camera 311 is controlled to be off (e.g., the operation state of back virtual camera 311 to be off) because it is very difficult and almost impossible to a user for looking back while the user walks or runs forward. Since back virtual camera 311 is off, back image is not rendered. Furthermore, resolutions of at least one of right, left, up, and down virtual cameras may be controlled to be comparatively lower than front virtual camera 301.

In addition, resolutions of virtual cameras may be controlled differently according to the traveling speed of a user. For example, when the user runs at a comparatively fast speed, resolutions of at least one of right, left, up, and down virtual cameras may be controlled to be relatively lower than i) front virtual camera 301 and ii) the resolutions set for walking or running at a slower speed.

When the determined user movement state is "stay-still," all virtual camera 301 to 311 may be controlled to be on, and resolutions of all virtual cameras may be controlled to be a predetermined resolution level (e.g., normal resolution).

In accordance with at least one embodiment, virtual cameras may be implemented as a series of code sets controlled through parameters and attributes. Accordingly, the parameters and attributes of each virtual camera may be generated based on the determined user movement state, and the operation states and the resolutions of the virtual cameras may be controlled by executing the code sets of virtual cameras using the generated parameters and attributes.

At step S1060, an image looking through each virtual camera may be rendered as a captured image of each virtual camera by executing virtual cameras 301 to 311 with the determined parameters and attributes (e.g., operation states and resolutions). The rendered image of each virtual camera is an image of a virtual space, which the user can look through a view finder of the virtual camera. That is, the rendered image of each virtual camera is a photographic image of a virtual space, which can be captured by a corresponding virtual camera located at a determined position and facing a designated direction based on the user tracking information.

For example, six images may be rendered through controlling the created virtual cameras. The six rendered image may include i) up-image of up virtual camera 301 facing an up-direction from the user location in the virtual space, ii) down-image of down virtual camera 303 facing a down-direction from the user location in the virtual space, iii) left image of left virtual camera 305 facing a left-direction from the user location in the virtual space, v) right image of right virtual camera 307 facing a right-direction from the user location in the virtual space, vi) front image of front virtual camera 309 facing a front-direction from the user location in the virtual space, and vii) back image of back virtual camera 311 facing a back-direction from the user location in the virtual space.

As described, according to the user movement state, the number of images and a resolution of each image may be changed. For example, when the determined user movement state is "walking-through" or "running," five images may be rendered because back virtual camera 311 is controlled to be off (e.g., the operation state of back virtual camera 311 to be off). Furthermore, at least one of right, left, up, and down images may be rendered to have resolutions comparatively lower than that of the front image, and a back image may not be generated.

In addition, when the user runs at a comparatively fast speed, at least one of right, left, up, and down images may be generated to have a resolution relatively lower than i) front image and ii) the resolutions of images for walking or running at a slower speed.

When the determined user movement state is "stay-still," all six images of virtual camera 301 to 311 may be generated to have a predetermined reference resolution level (e.g., normal resolution).

At step S1070, the rendered images of the virtual cameras may be stitched using a predetermined stitching algorithm for producing a 360-degree image of the virtual space. For example, the six images may be stitched, the six images include: i) up-image captured from up virtual camera 301 facing an up-direction from the user location in the virtual space, ii) down-image captured from down virtual camera 303 facing a down-direction from the user location in the virtual space, iii) left image captured from left virtual camera 305 facing a left-direction from the user location in the virtual space, v) right image captured from right virtual camera 307 facing a right-direction from the user location in the virtual space, vi) front image captured from front virtual camera 309 facing a front-direction from the user location in the virtual space, and vii) back image captured from back virtual camera 311 facing a back-direction from the user location in the virtual space.

In accordance with at least one embodiment, the data amount of the stitched image may be smaller than that of a typical stitched image for 360-degree image because at last one of six images is not included and has a less resolution than others. Accordingly, a transmission latency for transmitting the stitched image from server 100 to user device 200 may be significantly reduced in accordance with at least one embodiment.

At step S1080, the stitched image may be transmitted to user device 200 through communication network 400. For example, the stitched image (e.g., the created 360-degree image) may be streamed to user device 200 using a predetermined media-streaming scheme. That is, server 100 may stitch the rendered images of the virtual cameras for producing a 360-degree image of the virtual space and stream the created 360-degree image to user device 200 in a form of a stitched texture data. As described, FIG. 5 illustrates the stitched image being streaming to user device 200. That is, server 100 may generate the stitched image having data amount smaller than that of a typical stitched image for 360-degree image according to the user movement state because at last one of six images is not included and has a less resolution than others. Accordingly, a transmission latency for transmitting the stitched image from server 100 to user device 200 may be significantly reduced in accordance with at least one embodiment.

Figure 11:
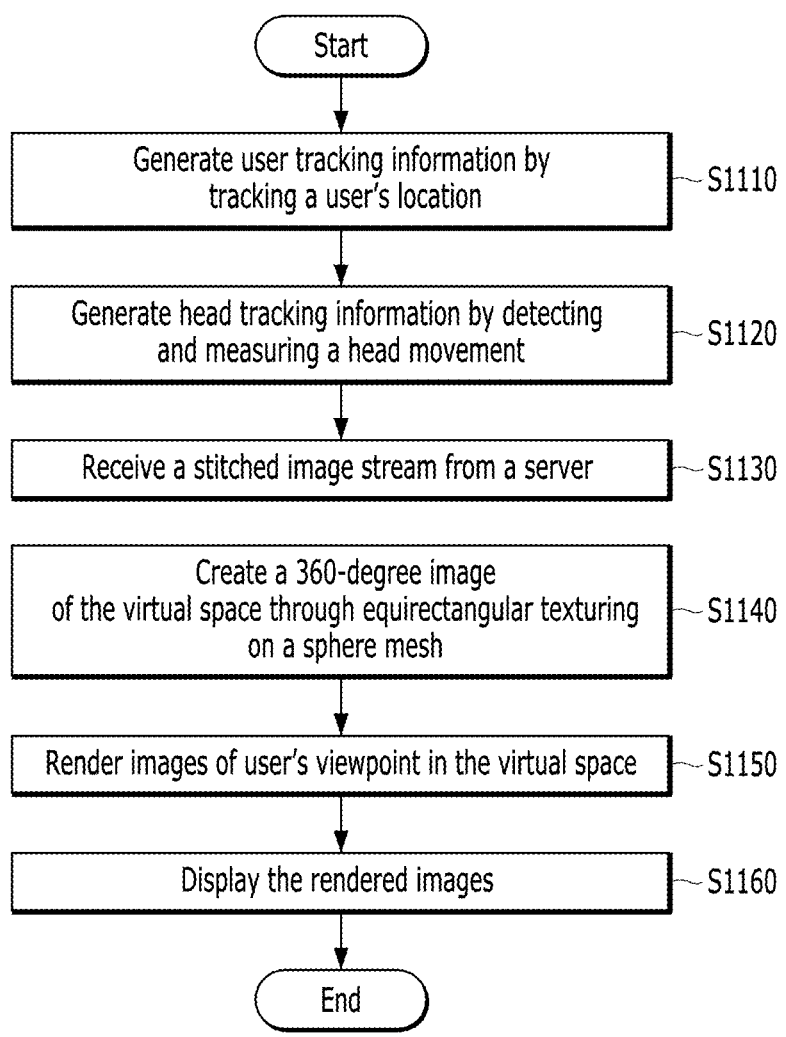
FIG. 11 is a flowchart illustrating operations of a user device for providing a VR experience server in accordance with at least one embodiment.

FIG. 11 is a flowchart illustrating operations of a user device for providing a VR experience server in accordance with at least one embodiment. Referring to FIG. 11, information may be collected for tracking a user's location, and user tracking information may be generated using the collected information in accordance with at least one embodiment at step S1110. For example, a location value (e.g., coordinate value) of user device 200 in a predetermined virtual space may be monitored using a location sensor (e.g., GPS sensor) in user device 200. The generated user tracking information may be transmitted to server 100 through communication circuit 230 at a regular interval, whenever the user tracking information is generated, or when a user's location is changed.

At step S1120, information may be collected by tracking a user's head movement, and head tracking information may be generated using the collected information. For example, head motions (e.g., rotational velocity, angular velocity, acceleration value) of user device 200 may be detected and measured using inertial sensors (e.g., head motion tracking sensors: gyroscopes, accelerometers) in user device 200.

At step S1130, a stitched image stream (e.g., stitched texture data) may be received from server 100 through communication circuit 230.

At step S1140, a 360-degree image of the virtual space may be created through equirectangular texturing on a sphere mesh. For example, a 360-degree image may be generated through equirectangular texturing on a sphere mesh using the received stitched images from server 100.

At step S1150, images of user's viewpoint in the virtual space (e.g., stereo pairs: images will be displayed on the stereoscopic head-mounted display) may be rendered. For example, a 3D coordinate and a directional coordinate in the virtual space may be collected using the location sensor and the inertia sensor, and images of stereo pairs may be rendered corresponding to a user's view point from the 360-degree image of the virtual space.

Furthermore, whenever head movement is detected, stereo pair images of user's viewpoint in the virtual space may be generated using the 360-degree image which is generated at user device 200. For example, FIG. 8 is a diagram for describing a rendering process for detecting head movement and rendering stereopairs image of a user's viewpoint in accordance with at least one embodiment. As shown in FIG. 8, the rendered image may be produced by performing i) a stereo rendering operation based on head tracking information (e.g., head movement of user's head) and ii) a lens-warping operation (e.g., barrel distortion), but the embodiments are not limited thereto.

For creating the stereoscopic pair image, a virtual camera may be created and set up at a user's location in the 360-degree image (e.g., equirectangular textured sphere mesh). Then, the stereoscopic pair image may be rendered whenever the head movement detected. That is, when the head movement is detected, i) user's coordinate may be obtained from the head movement information, ii) a viewpoint (e.g., photographic direction, viewfinder direction) of the virtual camera may be determined corresponding to the viewpoint of the user in the 360-degree image, and iii) images of the virtual camera may be rendered based on the determined viewpoint, as the stereoscopic pair image.

At step S1160, the rendered images (e.g., stereoscopic image) may be displayed through the stereoscopic head-mounted display).

As described, user device 200 may receive the stitched texture data from server 100 and produce the rendered image to be displayed on corresponding display using the received stitched texture data based on the head tracking information collected through various sensors mounted on user device 200 in accordance with at least one embodiment. That is, such a rendered image to be displayed on corresponding display may be dynamically changed according to the head tracking information. Since user device 200 may directly produce the rendered image, it is possible to reduce and prevent the typical latency problem (e.g., jittering problem).

Figure 12:
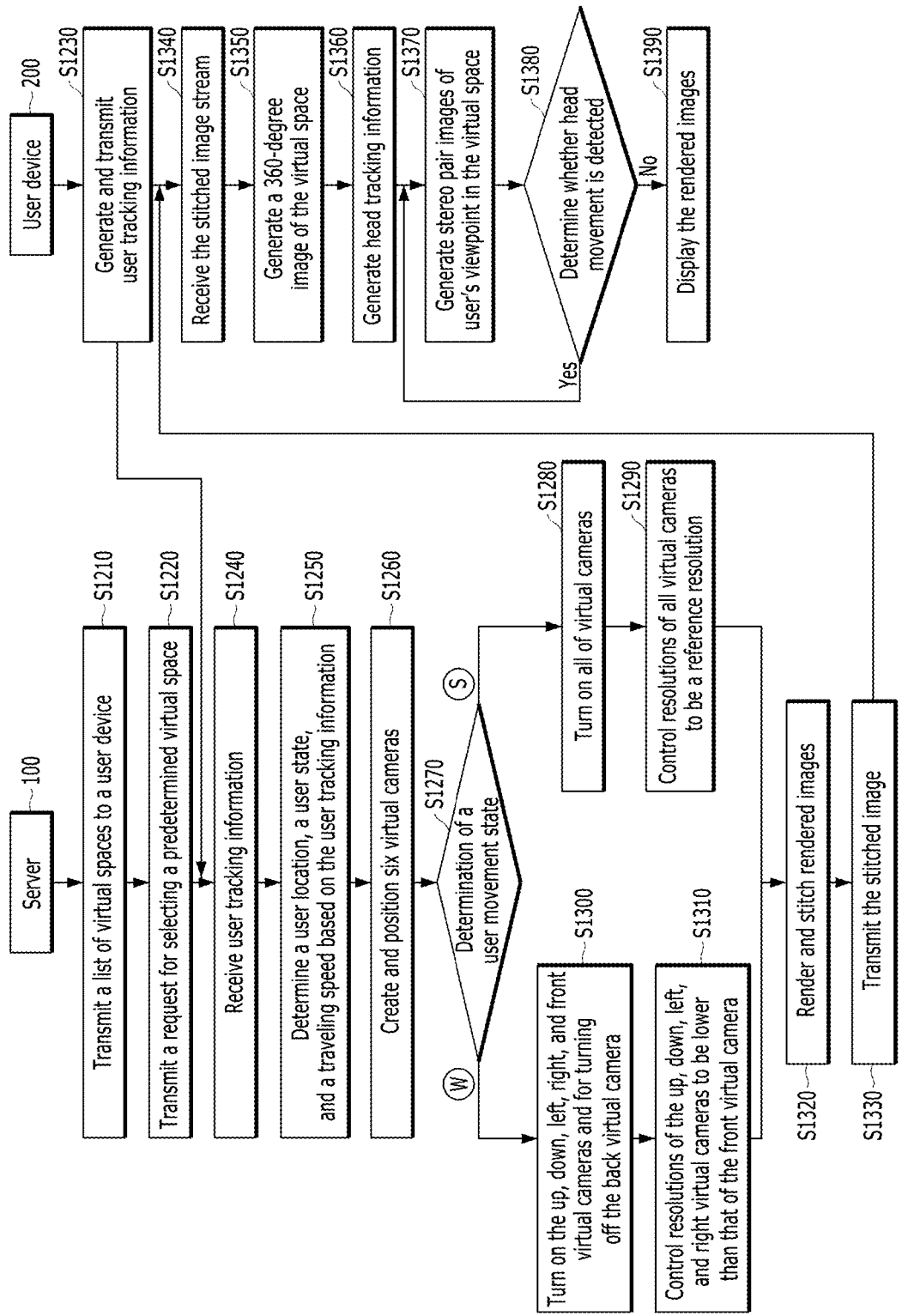
FIG. 12 is a flowchart illustrating operations of a VR experience service system in accordance with at least one embodiment.

FIG. 12 is a flowchart illustrating operations of a VR experience service system in accordance with at least one embodiment. Referring to FIG. 12, at step S1210, server 100 may transmit a list of virtual spaces to user device 200. At step S1220, user device 200 may transmit a request for selecting a predetermined virtual space to server 100 based on the list of virtual space. At step S1240, server 100 may receive user tracking information at a regular interval or whenever a user makes movements in the requested virtual space. At step S1250, server 100 may determine a user location in the requested virtual space, a user state, and a traveling speed based on the user tracking information.

At step S1260, based on the determined user location, server 100 may create six virtual cameras (e.g., up, down, left, right, front, and back virtual cameras) and position the six virtual cameras at the determined user location with a predetermined distance between the cameras in the virtual space.

At step S1270, server 100 may determine whether the user movement state is one of "walk-through" or "stay-still." When the user movement state is "stay-still" (S1270-stay-still), server 100 may generate parameters and attributes of virtual cameras for turning on all of the up, down, left, right, front, and back virtual cameras at step S1280 and for controlling resolutions of all of up, down, left, right, front, and back virtual cameras to be a reference resolution at step S1290.

When the user movement state is "walk-through" (S1270-walk through), server 100 may generate parameters and attributes of virtual cameras for turning on the up, down, left, right, and front virtual cameras and for turning off the back virtual camera at step S1300 and for controlling resolutions of the up, down, left, and right virtual cameras to be lower than that of the front virtual camera at step S1310.

At step S1320, server 100 may render images of the virtual cameras and stitched rendered images using a predetermined stitching method. At step S1330, server 100 may transmit the stitched image to user device 200 using a predetermined media-streaming scheme.

At step S1230, user device 200 may generate user tracking information and transmit the generated user tracking information at a regular interval or whenever the user movement is detected.

At step S1340, user device 200 may receive the stitched image stream (e.g., stitched texture data) from server 100 through communication circuit 230. At step S1350, user device 200 may generate a 360-degree image of the virtual space through equirectangular texturing on a sphere mesh, create a virtual camera as a user's viewpoint, and position the virtual camera at the user's location in the generated 360-degree image of the virtual space.

At step S1360, user device 200 may generate head tracking information by detecting and measuring a head movement. At step S1370, user device 200 may generate stereo pair images of user's viewpoint in the virtual space by controlling the virtual camera. For creating the stereoscopic pair image, a virtual camera may be created and set up at a user's location in the 360-degree image (e.g., equirectangular textured sphere mesh). Then, the stereoscopic pair image may be rendered whenever the head movement detected. That is, when the head movement is detected, i) user's coordinate may be obtained from the head movement information, ii) a viewpoint (e.g., photographic direction, viewfinder direction) of the virtual camera may be determined corresponding to the viewpoint of the user in the 360-degree image, and iii) images of the virtual camera may be rendered based on the determined viewpoint, as the stereoscopic pair image. For example, a 3D coordinate and a directional coordinate in the virtual space may be collected using the location sensor and the inertia sensor, and images of stereo pairs may be rendered corresponding to a user's view point from the 360-degree image of the virtual space.

At step S1390, user device 200 may determine whether head movement is detected based on the head tracking information. When the head movement is detected (S1390-Yes), user device 200 may generate stereo pair image of the changed user's viewpoint at step S1370.

At step S1400, user device 200 may display the rendered images (e.g., stereoscopic image) through the stereoscopic head-mounted display.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for providing, by a server, a virtual reality service to a user device, the method comprising:
   receiving user tracking information from the user device;
   creating a plurality of virtual cameras as a series of code sets with parameters and attributes and setting up the plurality of virtual cameras at predetermined locations corresponding to a user location in a predetermined virtual space based on the user tracking information by setting up different parameters and attributes of each virtual camera;
   determining a user movement state based on the user tracking information;
   controlling an operation state and a resolution of each of the plurality of virtual cameras based on the determined user movement state;
   rendering images of each of the plurality of virtual cameras based on the controlled operation state and the controlled resolution;
   stitching the rendered images of the plurality of virtual cameras; and
   transmitting the stitched images to the user device.

2. The method of claim 1, wherein the predetermined virtual space is a virtual space created with three-dimensional graphic images generated by the server.

3. The method of claim 1, wherein the plurality of virtual cameras include:

an up virtual camera facing an up-direction from the user location in the virtual space for capturing an up-image of the virtual space that a user looks upwards at the user location in the virtual space;

a down virtual camera facing a down-direction from the user location in the virtual space for capturing a down-image that the user looks downward from the user location;

a left virtual camera facing a left-direction from the user location in the virtual space for capturing a left image that the user looks left from the user location;

a right virtual camera facing a right-direction from the user location in the virtual space for capturing a right image that the user looks right from the user location;

a front virtual camera facing a front-direction from the user location in the virtual space for capturing a front image that the user looks front from the user location; and a back virtual camera facing a back-direction from the user location in the virtual space for capturing a back image that the user looks back from the user location.

4. The method of claim 1, wherein the user tracking information includes at least one of a position value, a rotational velocity, an acceleration value, and an angular velocity.

5. The method of claim 1, wherein the determining a user movement state comprises:

calculating a traveling speed of a user based on the user tracking information; and determining the user movement state as one of a walk-through state and a stay-still state based on a calculation result.

6. The method of claim 3, further comprising controlling the plurality of virtual cameras comprises:

when the user movement state indicates a walk-through state, controlling the back virtual camera to be turned off.

7. The method of claim 3, further comprising controlling the plurality of virtual cameras comprises:

when the user movement state indicates a walk-through state, controlling at least one of resolutions of the up virtual camera, the down virtual camera, the left virtual camera, and the right virtual camera to be lower than that of the front virtual camera.

8. The method of claim 3, further comprising controlling the plurality of virtual cameras comprises:

when the user movement state indicates a walk-through state, controlling at least one of resolutions of the up virtual camera, the down virtual camera, the left virtual camera, and the right virtual camera to be in inverse proportion to a travelling speed of the user.

9. The method of claim 3, further comprising controlling the plurality of virtual cameras comprises:

when the user movement state indicates a stay-still state, controlling all of the up virtual camera, the down virtual camera, the left virtual camera, the right virtual camera, the front virtual camera, and the back virtual camera to be turned on.

10. A user device for providing a virtual reality experience server to a user, the user device comprising:

a communication circuit configured to communicate with a server and at least one motion tracking device through a communication network;

a memory configured to store information received from at least one of the server and the motion tracking device and information generated by performing operations; and a processor configured to generate user tracking information that indicates a user movement state by controlling information from at least one of internal sensors and motion tracking devices and transmit the user tracking information to the server through the communication circuit, generate head tracking information that indicates a head movement state of the user using the internal sensors, receive a stitched image for a 360-degree image of a predetermined virtual space from the server;

render a user-viewpoint image according to the head tracking information using the received stitched image, and display the rendered user-viewpoint image on a display, wherein the server creates the 360-degree image of the predetermined virtual space by i) creating a plurality of virtual cameras as a series of code sets with parameters and attributes and ii) setting up the plurality of virtual cameras at predetermined locations corresponding to a user location in the predetermined virtual space based on the user tracking information by setting up different parameters and attributes of each virtual camera.

11. The user device of claim 10, wherein the stitched image is a stitched texture data generated by the server for enabling the user device to generate the 360-degree image of the predetermined virtual space.

12. The user device of claim 10, wherein the processor is configured to:

generate the 360-degree image of the virtual space by performing equirectangular texturing on a sphere mesh using the stitched image;

render stereo-pair images of a user's viewpoint in the 360-degree image of the virtual space whenever head movement is detected based on the head tracking information.

13. The user device of claim 12, wherein to render stereo-pair image, the processor is configured to perform i) a stereo rendering operation based on the head tracking information and ii) a lens-warping operation on the rendering.

14. The user device of claim 12, the processor is configured to:

obtain a user's coordinate from the head tracking information;

determine a viewpoint of the virtual camera corresponding to the viewpoint of the user in the 360-degree image of the virtual space; and render images captured by the virtual camera based on the determined viewpoint, as a stereoscopic pair image.

15. A server for providing, by the server, a virtual reality service to a user device, the server comprising:

a communication circuit configured to communicate with the user device and at least one motion tracking device through a communication network;

a memory configured to store information received from at least one of the user device and the motion tracking device and information generated by performing operations; and a processor configured to receive user tracking information from the user device through the communication circuit;

create a plurality of virtual cameras as a series of code sets with parameters and attributes and set up the plurality of virtual cameras at predetermined locations corresponding to a user location in a predetermined virtual space based on the user tracking information by setting up different parameters and attributes of each virtual camera;

determine a user movement state based on the user tracking information;

control an operation state and a resolution of each of the plurality of virtual cameras based on the determined user movement state;

render images of each of the plurality of virtual cameras based on the controlled operation state and the controlled resolution;

stitch the rendered images of the plurality of virtual cameras; and transmit the stitched images to the user device.

16. The server of claim 15, wherein the plurality of virtual cameras include:

an up virtual camera facing an up-direction from the user location in the virtual space for capturing an up-image of the virtual space that a user looks upwards at the user location in the virtual space;

a down virtual camera facing a down-direction from the user location in the virtual space for capturing a down-image that the user looks downward from the user location;

a left virtual camera facing a left-direction from the user location in the virtual space for capturing a left image that the user looks left from the user location;

a right virtual camera facing a right-direction from the user location in the virtual space for capturing a right image that the user looks right from the user location;

a front virtual camera facing a front-direction from the user location in the virtual space for capturing a front image that the user looks front from the user location; and a back virtual camera facing a back-direction from the user location in the virtual space for capturing a back image that the user looks back from the user location.

17. The server of claim 16, wherein the processor is configured to:

when the user movement state indicates a walk-through state, control the back virtual camera to be turned off.

18. The server of claim 16, wherein the processor is configured to:

when the user movement state indicates a walk-through state, control at least one of resolutions of the up virtual camera, the down virtual camera, the left virtual camera, and the right virtual camera to be lower than that of the front virtual camera.

19. The server of claim 16, wherein the processor is configured to:

when the user movement state indicates a walk-through state, control at least one of resolutions of the up virtual camera, the down virtual camera, the left virtual camera, and the right virtual camera to be in inverse proportion to a travelling speed of the user.

20. The server of claim 16, wherein the processor is configured to:

when the user movement state indicates a stay-still state, control all of the up virtual camera, the down virtual camera, the left virtual camera, the right virtual camera, the front virtual camera, and the back virtual camera to be turned on.

* * * * *